Feb. 7, 1961 B. T. MATTHIAS 2,970,961
MAGNETIC MATERIAL
Filed March 4, 1959 2 Sheets-Sheet 1

INVENTOR
B. T. MATTHIAS
BY George S. Indig
ATTORNEY

Feb. 7, 1961 B. T. MATTHIAS 2,970,961

MAGNETIC MATERIAL

Filed March 4, 1959 2 Sheets-Sheet 2

INVENTOR
B. T. MATTHIAS
BY George S. Indig
ATTORNEY 2,970,961

MAGNETIC MATERIAL

Bernd T. Matthias, Berkeley Heights, N.J., assignor to Bell Telephone Laboratories, Incorporated, New York, N.Y., a corporation of New York

Filed Mar. 4, 1959, Ser. No. 797,244

5 Claims. (Cl. 252—62.5)

This invention relates to a ferromagnetic material, and to methods for making it, and relates particularly to a ferromagnetic material which is superconducting at low temperatures and methods for making it.

Materials which exhibit the phenomenon of superconductivity at low temperature are known in the art. Similarly, ferromagnetic materials are common and are found in nature. However, heretofore superconducting and ferromagnetic properties have not been found to coexist in the same material to any appreciable degree at the same temperature.

The present invention concerns a composition of matter which is both ferromagnetic and superconducting at the same temperature over an appreciable temperature range. The materials are compositions of yttrium, gadolinium, and osmium of the general type $AB_2$, where A is yttrium and gadolinium in certain proportions, and B is osmium. Specifically, the compositions can be represented by the formula $$(Y_{1.00-x}Gd_x)Os_2$$

where $x$ has a value between 0.10 and 0.01 (inclusive of the end values). Stated equivalently, the compositions are those within a range whose end members can be represented by the formulas $$(Y_{0.99}Gd_{0.01})Os_2 \text{ and } (Y_{0.90}Gd_{0.10})Os_2$$

Particularly useful compositions are those in which $x$ in the formula $$(Y_{1.00-x}Gd_x)Os_2$$

has a value between 0.03 and 0.10 inclusive, or between 0.03 and 0.08 inclusive. The composition showing both superconductivity and ferromagnetism at the highest temperature has the composition $$(Y_{0.94}Gd_{0.06})Os_2$$

The compositions show usefulness wherever simultaneous magnetic and superconducting properties are desirable. For example, the compositions could be used in making the memory elements in a memory matrix of the type described in the copending application of Umberto F. Gianola, Serial No. 690,478, filed October 16, 1957. As therein described, a memory element comprising a length of conducting wire, for example of copper, silver, gold, et cetera, having a thin skin of a magnetic metal thereon, is used to store informational bits. The magnetic skin is treated to have a preset easy direction of magnetization (e.g., parallel to the wire axis) by methods such as annealing the material in a magnetic field. The magnetic skin is then magnetized to align portions thereof parallel and/or antiparallel to the axis of the conductor. A current passed through the conductor (much of which passes through the skin) disturbs the magnetic fields set up by the magnetized skin, and these variations in flux density are "read" by detecting small current pulses generated in other conducting members aligned in the vicinity of the magnetized conductor. Since the currents used in the skin-coated conductors to disrupt the magnetization in the skin are small, the attenuation resulting in long wires can become a problem. The use of a superconducting magnetic skin improves the device by reducing attenuation.

Figures 1, 3:
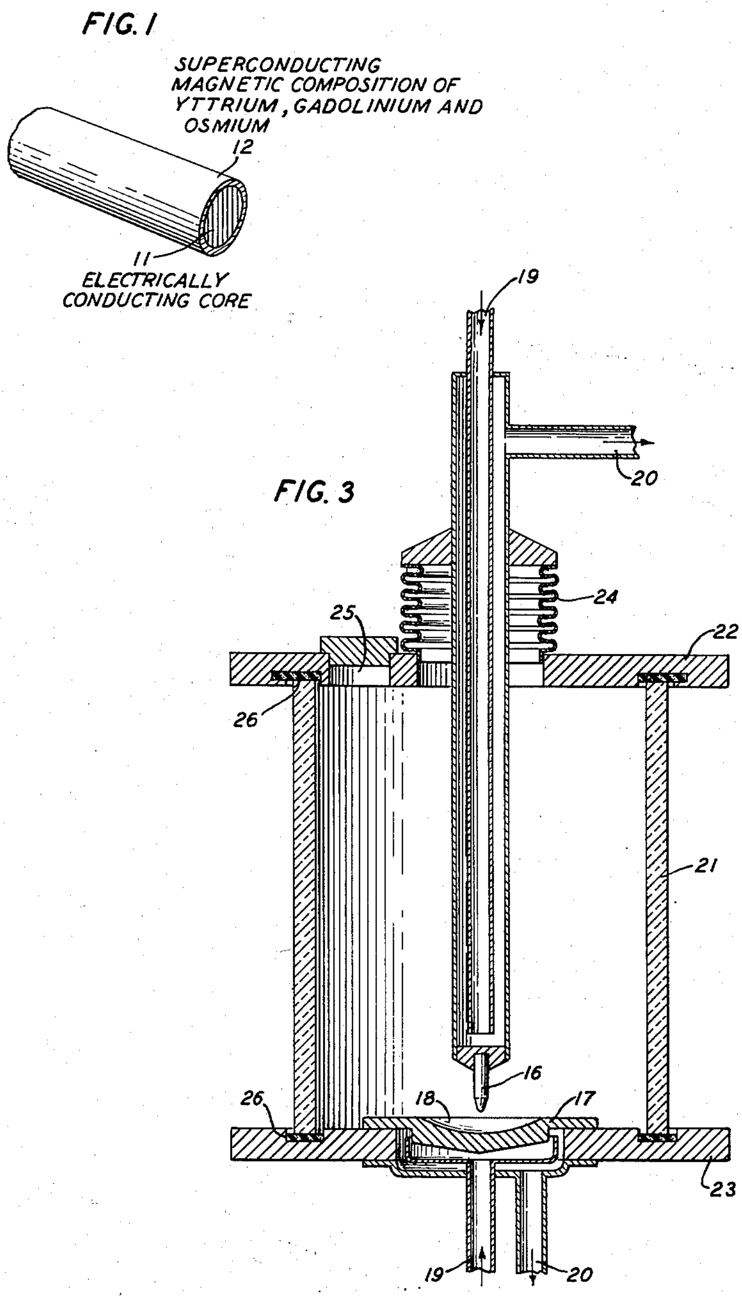
Figure 2:
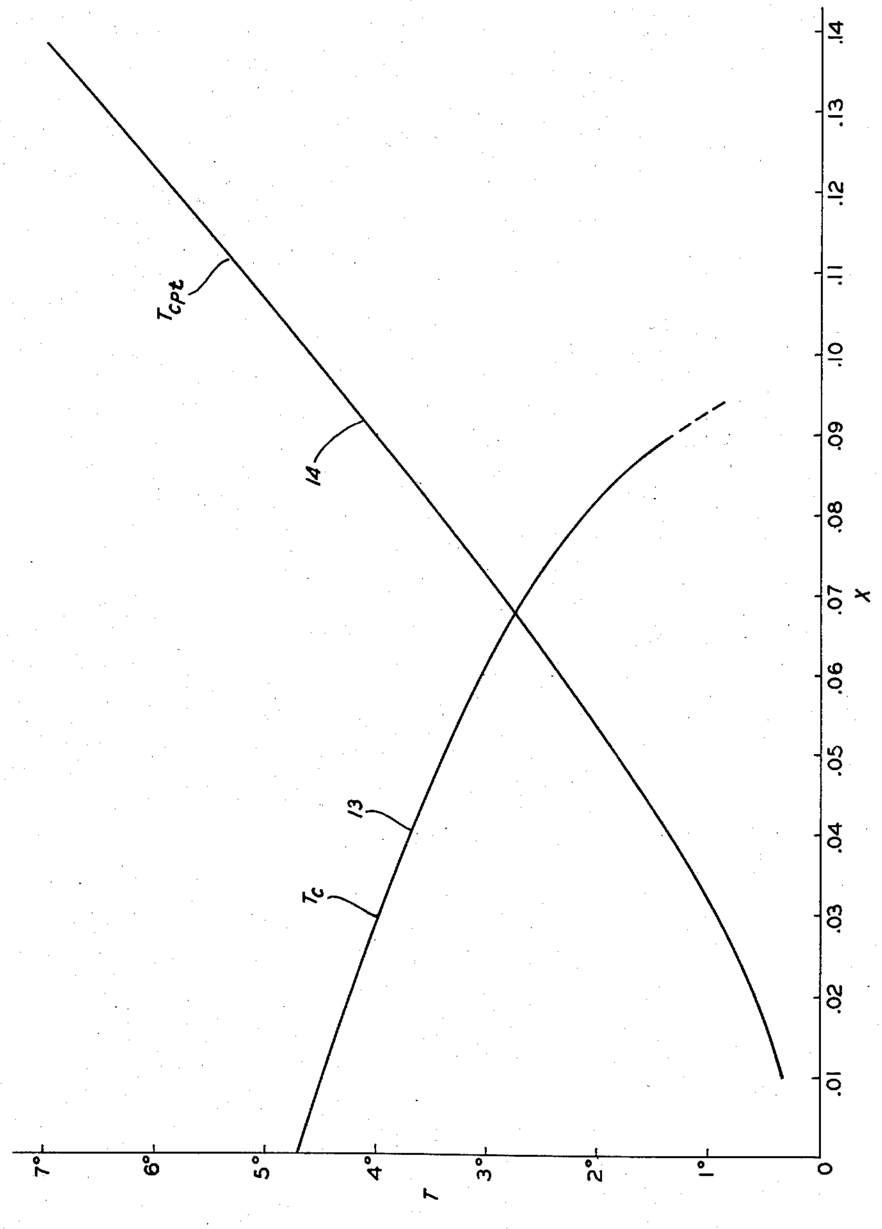

In the accompanying drawings:

Fig. 1 is a sectional view of a wire having a magnetic skin of superconducting material thereon;

Fig. 2 is a plot of the temperature, $T_c$, below which the materials of the present invention are superconducting, and the Curie temperature, $T_{Cpt}$, below which the materials are ferromagnetic, both plotted as a function of the composition of the materials; and Fig. 3 is a front elevation, partly in section, of an arc furnace particularly suitable for the preparation of the materials herein described.

In Fig. 1 is shown filament 11 of a conducting metal, such as copper, silver, or gold for example, on which there is thin film 12 of a superconducting magnetic composition of yttrium, gadolinium, and osmium.

In Fig. 2, the units of the ordinate are degrees Kelvin; the units of the abscissa are values of $x$ in the formula $$(Y_{1-x}Gd_x)Os_2$$

and $x$ is thus a measure of the composition of the material. Curve 13 is a plot of the superconducting transition temperature $T_c$ of the material as a function of $x$. Curve 14 is a plot of the Curie point $T_{Cpt}$ of the material as a function of $x$. In the region below curve 13, the dotted portions of which represent extrapolations, the material will be superconducting. In the region below curve 14, the material will be ferromagnetic. In any region lying below both curves 13 and 14 the materials will be both superconducting and ferromagnetic. The temperatures at which the materials will be of interest as both superconductors and as ferromagnetic materials are thus those below about 5 degrees Kelvin. Low temperatures to within a few fractional parts of a degree from absolute zero can be attained by boiling helium under reduced pressures and using supplementary magnetic cooling means known in the art.

In Fig. 3, the arc furnace shown comprises cathode 16, conveniently of a refractory metal such as tungsten, and anode plate 17, of a material such as copper, having depression 18 in its surface. Inlets 19 and outlets 20 are provided in cathode 16 and anode 17 for circulating cold water through the electrodes. Cathode 16 is sealed into the chamber formed by cylindrical glass wall 21 and upper and lower cover plates 22 and 23, respectively, by bellows 24. Bellows 24 permits movement of cathode 16 over the area of anode 17. Upper cover plate 22 has entry 25, sealed with a gas-tight seal to plate 22. Sample loading and unloading is conveniently carried out through entry 25. Other entries (not shown) in cover plate 22 are an inlet and exhaust for gases introduced into the furnace prior to and during heating. Glass wall 21 is sealed tightly to cover plates 22 and 23 with rubber gaskets 26.

Preparation of the new materials herein described is conveniently carried out in an arc furnace of the type described. In such a furnace pendant movable cathode 16 is used to strike an arc to water-cooled anode 17, usually in the form of a hollow flat plate. Cooling water is circulated over anode and cathode while the arc is active. Shallow depression 18 in the surface of the anode plate serves to hold the metals being alloyed, present in amounts corresponding to those wanted in the final composition, and the arc is struck to the anode in the vicinity of the reactants, which are fused by the heat of the arc. To promote complete mixing of the components of the composition, it is useful to agitate the mixture during heating. This can be done especially successfully by mounting the furnace, or at least the anode portions thereof, in gimbals or an equivalent mounting permitting motion in three dimensions. Alternatively, after the sample has been fused, the arc can be interrupted and the solidified melt turned over in depression 18, then remelted once more in the arc. By repeated turnings, homogeneity in the sample can be achieved. The electrode assembly is mounted in a gas-tight system, and the arc is struck in a partial vacuum or in an inert atmosphere such as argon, neon, krypton, xenon, or helium, so that the molten metals experience no unwanted side reactions such as oxidation. Argon is the gas usually used, but this is a matter of convenience only.

Temperatures in excess of 3500 degrees centigrade can easily be generated by the arc. Such a temperature is more than sufficient to fuse the metals yttrium, gadolinium, and osmium. However, the cooled anode keeps a thin layer of the materials being fused in a solid condition on the cold anode surface, so that the melt itself does not ever contact the metal of the anode. Alloying of the anode and the melt is avoided in this way.

For operation of a furnace of the type shown in Fig. 3, direct current of the order of 200 amperes to 300 amperes at 40 volts to 80 volts is required. A power unit rated at 400 amperes at 75 volts was conveniently used in the preparation of the materials herein described. Although the furnace operates at about 40 volts, it is convenient to have high open circuit voltage available for starting the arc. Heating is carried on until fusion of the sample metals is observed. A short additional period of heating to allow for more thorough mixing of the liquids may be optionally used.

The preparation of a composition of yttrium, gadolinium, and osmium of the type herein described is given in detail in the following examples.

*Example 1*

A sample mixture consisting of a lump of yttrium weighing 1.702 grams, a lump of gadolinium weighing 0.125 gram and a pellet of pressed osmium powder weighing 7.584 grams was placed in the anode depression of a furnace such as shown in Fig. 3. Argon was flushed through the furnace for about two minutes, then a reduced flow of argon was kept passing through the furnace by restricting the exhaust outlet. An arc was struck between the water-cooled electrodes. A current of about 200 amperes at 40 volts liquified the sample metals in about 10 seconds. The arc was kept on for about 30 seconds, then cut off and the melted sample allowed to solidify and cool. The sample was then inverted in the anode depression by manipulation through the furnace entry, and another arc was struck, as before. After 30 seconds of heating, the melt was again cooled and the sample inverted. A third and fourth heating, similar in detail with the two prior heatings, were then carried out.

After cooling, the homogeneous sample had a weight of 9.274 grams, as compared with 9.411 grams of starting materials. The bulk of the loss is due to evaporation. The final material had a composition corresponding with the formula $$(Y_{0.96}Gd_{0.04})Os_2$$

It is to be understood that materials other than the three separate metals mentioned in the example could have been used as starting materials. For example, solid solutions of $GdOs_2$ in $YOs_2$ can be formed, or solid solutions of Gd in $YOs_2$, and so forth, if these compounds are available. The physical form of the starting materials is not critical. Powders, ingots, flakes, and other forms are equally operable.

Measurement of the superconducting and ferromagnetic properties of the sample were measured by suspending the sample in a sealed capsule within a detector coil, which coil is in turn suspended within a larger field coil. The circuits of the detector and field coils have coupled reluctance elements, adjusted when there is no sample in the detector coil so that variations in the flux of the field coil caused by opening the field coil circuit generate currents in the detector coil which are null-balanced by equal and opposite currents set up in the detector circuit by the variable reluctance coupling.

The sample is now inserted into the detector coil. Variations in the field flux will induce a current in the detector coil, which contains a ballistic galvanometer. As the material is diamagnetic or paramagnetic, the deflections of the galvanometer are in a positive or negative sense, indicating fewer or more flux lines, respectively, passing through the sample and detector coil than passed through the empty detector coil when the circuit was null-balanced.

The materials herein described show galvanometer deflections as if they were diamagnetic—due not to diamagnetism but to the presence of currents flowing within the materials. These non-attenuating currents, induced in the superconductor and revealing the superconducting properties of the materials, cut down the flux lines which can permeate the material, and the material registers as a diamagnetic substance.

That the material is neither diamagnetic nor paramagnetic, but ferromagnetic, is detected by subjecting the sample to a magnetizing field, cutting off the magnetizing field, and moving the sample in the detector coil. Flux lines from the remanent magnetization of the sample, cutting the wires of the detector coil, induce currents detectable on the ballistic galvanometer in the detector coil circuit.

*Example 2*

The identical procedure set forth in Example 1 was carried out using the following amounts of starting ingredients: 1.640 grams of yttrium, 0.252 gram of gadolinium and 7.626 grams of osmium. The physical form of the starting ingredients was the same as set forth in Example 1.

The resultant sample was homogeneous and had a weight of 9.318 grams, as compared with a total weight of 9.518 grams of starting ingredients. The final material had a composition corresponding with the formula $$(Y_{0.92}Gd_{0.08})Os_2$$

The exemplary compositions, as obtained in accordance with Examples 1 and 2 above, were stoichiometric. Experimentation has, however, shown that a variation of stoichiometry by amounts of as great as $\pm 10$ percent of the concerned ingredient does not materially affect the resultant Curie point or superconducting transition point. It is therefore evident that such non-stoichiometric materials are, in fact, solid solutions of excess ingredient or ingredients in a matrix of the stoichiometric compound. It should, therefore, be understood that insofar as the appended claims specify stoichiometric compounds, they have reference only to the active compound itself. It is, therefore, intended that the scope of the claims be sufficient to include the designated stoichiometric compounds containing excess ingredient or ingredients in solid solution therewith.

Although specific embodiments of the invention have been shown and described herein, it is to be understood they are but illustrative and not to be construed as limiting on the scope and spirit of the invention.

What is claimed is:

1. A material corresponding to the formula $$(Y_{1.00-x}Gd_x)Os_2$$

where $x$ has a value from 0.01 to 0.10.

2. A material as described in claim 1 for which $x$ has a value between 0.03 and 0.10, inclusive of these values.

3. A material as described in claim 1 for which $x$ has a value between 0.03 and 0.09, inclusive of these values.

4. A material as described in claim 1 for which $x$ has the approximate value 0.07.

5. An electrically conducting metallic filament having a coating of a ferromagnetic superconducting material on its surface, said ferromagnetic superconducting material having a composition corresponding to the formula $$(Y_{1.00-x}Gd_x)Os_2$$

where $x$ has a value from 0.01 to 0.10.

References Cited in the file of this patent

UNITED STATES PATENTS

| | | |
|---|---|---|
| 1,781,490 | Armstrong | Nov. 11, 1930 |
| 2,165,310 | Spaeth | July 11, 1939 |

| | | |
|---|---|---|
| 2,191,479 | Hopkins | Feb. 27, 1940 |
| 2,576,456 | Harvey et al. | Nov. 27, 1951 |
| 2,715,109 | Albers-Schoenberg | Aug. 9, 1955 |
| 2,734,244 | Herres | Feb. 14, 1956 |
| 2,762,856 | Newcomb et al. | Sept. 11, 1956 |
| 2,822,302 | McCaughna | Feb. 4, 1958 |
| 2,899,294 | Siemons | Aug. 11, 1959 |

FOREIGN PATENTS

| | | |
|---|---|---|
| 724,675 | Great Britain | Feb. 23, 1955 |
| 735,375 | Great Britain | Aug. 17, 1955 |